United States Patent
Huberman et al.

(10) Patent No.: US 11,871,292 B2
(45) Date of Patent: Jan. 9, 2024

(54) METHOD AND SYSTEM FOR LOCALIZATION-BASED DATA CONNECTIVITY TRANSITIONING

(71) Applicants: Sean Huberman, Guelph (CA); Majid Bavand, Ottawa (CA)

(72) Inventors: Sean Huberman, Guelph (CA); Majid Bavand, Ottawa (CA)

(73) Assignee: MAPSTED CORP., Mississauga (CA)

( * ) Notice: Subject to any disclaimer, the term of this patent is extended or adjusted under 35 U.S.C. 154(b) by 137 days.

(21) Appl. No.: 17/238,119

(22) Filed: Apr. 22, 2021

(65) Prior Publication Data

US 2021/0243666 A1    Aug. 5, 2021

Related U.S. Application Data

(63) Continuation of application No. 16/136,586, filed on Sep. 20, 2018, now abandoned.

(51) Int. Cl.
| | |
|---|---|
| *H04W 36/00* | (2009.01) |
| *H04W 36/32* | (2009.01) |
| *H04W 4/02* | (2018.01) |
| *H04W 36/08* | (2009.01) |
| *G01S 5/02* | (2010.01) |
| *H04W 4/33* | (2018.01) |

(52) U.S. Cl.
CPC ......... *H04W 36/32* (2013.01); *G01S 5/02521* (2020.05); *G01S 5/02585* (2020.05); *H04W 4/02* (2013.01); *H04W 36/08* (2013.01); *H04W 4/33* (2018.02)

(58) Field of Classification Search
None
See application file for complete search history.

(56) References Cited

U.S. PATENT DOCUMENTS

| | | | |
|---|---|---|---|
| 9,448,072 B2 * | 9/2016 | Bandyopadhyay | ........................ G01C 21/3626 |
| 2003/0073411 A1 * | 4/2003 | Meade, II | ............. G06F 1/1613 455/3.06 |

* cited by examiner

*Primary Examiner* — Willie J Daniel, Jr.

(57) ABSTRACT

A method and a system of maintaining data connectivity between a mobile device during traversal of a pedestrian facility and a server computing device via a set of intermediary communication devices. The method, executed in a processor of the server device, comprises while the mobile device is in data connectivity via a first intermediary communication device, receiving an indication that the mobile device is localized to a position between a first and a second intermediary communication devices of the set of intermediary communication devices, based on an inertial sensor device including at least one of a gyroscope, an accelerometer and the magnetometer, determining a directional heading of the mobile device, inferring, based on the directional heading, at least one of an unobstructed line of sight wireless signal transmission path to the second intermediary communication device, and a more obstructed line of sight wireless signal transmission path to the first intermediary communication device, and based on the inferring, maintaining the data connectivity with the mobile device by switching from the first intermediary communication device to the second intermediary communication device.

20 Claims, 4 Drawing Sheets

Receiving, while the mobile device is in data connectivity via a first intermediary communication device of the set, a request for transitioning the data connectivity to a second intermediary communication device of the set, the request including a first position of the mobile device as localized, based on fingerprint data of the pedestrian facility, at a first distance from the first position to the first intermediary communication device, and a second distance from the first position to a second intermediary communication device of the set   310

300

Maintaining the data connectivity with the mobile device by switching, based on the first and the second distances, from the first intermediary communication device to the second intermediary communication device

While the mobile device is in data connectivity with a server computer via a first intermediary communication device, receiving an indication that the mobile device is localized to a position between a first and a second intermediary communication device    410

Determining a directional heading of the mobile device along a sequence of positions being traversed based on any one of more of an accelerometer, a gyroscope and a magnetometer    420

Inferring, based on the directional heading, at least one of an unobstructed line of sight wireless signal transmission path to the second intermediary communication device, and a more obstructed line of sight wireless signal transmission path to the first intermediary communication device    430

Based on the inferring, maintaining the data connectivity with the mobile device by switching from the first intermediary communication device to the second intermediary communication device    440

FIG. 4

METHOD AND SYSTEM FOR LOCALIZATION-BASED DATA CONNECTIVITY TRANSITIONING

CROSS-REFERENCE TO RELATED APPLICATION

This application claims the benefit of priority to U.S. application Ser. No. 16/136,586 filed Sep. 20, 2018, which is hereby incorporated in the entirety herein.

TECHNICAL FIELD

The disclosure herein relates to the field of mobile device indoor navigation and localization.

BACKGROUND

Users of mobile devices are increasingly using and depending upon indoor positioning and navigation applications and features. Seamless, accurate and dependable indoor positioning can be difficult to achieve using satellite-based navigation systems when the latter becomes unavailable or sporadically available, such as within enclosed or partly enclosed urban infrastructure and buildings, including hospitals, shopping malls, airports, college buildings, sports arenas and industrial warehouses. Indoor navigation solutions that assist a pedestrian user by providing robust and uninterrupted data connectivity along a pedestrian route advance the utility, and ready adoption, of indoor positioning systems. Frequently, indoor navigation solutions rely on wireless data network connections maintained via wireless access point devices installed in fixed locations within the indoor facility. It too often observed, however, when having information about the spatial locations of specific access points devices as deployed, that network data connectivity for the mobile device is too often established via a farther-away access point, rather than one or more that are significantly closer in proximity, consequently affecting the integrity and quality of the networked data connection for a mobile device user during traversal of the indoor facility.

DETAILED DESCRIPTION

Among other technical effects and advantages, embodiments provided herein recognize, and improve upon, a situation where, relatively often, it can observed that a user of a carried mobile computing and communication device (also referred to as mobile device herein) navigating a pedestrian route within an indoor facility may remain connected to a spatially far-away wireless access point device even when an alternate wireless access point device in the same data network becomes significantly closer as the user traverses along the route. It is further observed that the process of handing off data connectivity to a nearby access point may not occur until the mobile device-carrying user has traversed away from that access point, and in fact has already reached a position far from it. Although in such a situation the user's mobile device may be still be able to transmit data bi-directionally with a network management server device, the quality of the data transmission may not be as high-quality or error-free as compared with establishing, and transitioning to, a connection via the significantly closer wireless access point device. Embodiments provided herein improve on existing and currently-deployed solutions by having the mobile device assume a primary role for a network management server deciding when to transition, or switch, data connectivity of the mobile device between individual ones in a set of networked wireless access point devices deployed in an indoor or pedestrian facility. In a particular embodiment, based on the mobile device localizing itself to determine its spatial position relative to the set of networked wireless access point devices, independently and without any input from the network management server device, the mobile device may push a notification to the network management server device, requesting a transition, or a switch, from one wireless access point device with which it is currently connected to an identified alternate wireless access point device of the set that might have become closer, or is about to become closer, in spatial proximity.

Corresponding to a sequence of locations along the mobile device route being traversed in the pedestrian facility, fingerprint measurements may be correlated in time and position with wireless communication signal signatures and mobile device sensor readings along the route that the user's mobile device may traverse relative to the indoor or pedestrian facility. In particular, embodiments described herein advantageously provide a user in possession of a mobile device with a solution that ensures the best data connectivity and data communication with a network management server device while traversing along a route in a pedestrian facility calibrated for fingerprint data as established in a fingerprint database accessible to the network management server device.

In particular, a method of maintaining data connectivity between a mobile device during traversal of a pedestrian facility and a server computing device via a set of intermediary communication devices is provided. The method, executed in a processor of the server device, comprises receiving, while the mobile device is in data connectivity via a first intermediary communication device of the set, a request for transitioning the data connectivity to a second intermediary communication device of the set, the request including a first position of the mobile device as localized, based on fingerprint data of the pedestrian facility, at a first distance from the first position to the first intermediary communication device, and a second distance from the first position to a second intermediary communication device of the set, and maintaining the data connectivity with the mobile device by switching, based on the first and the second distances, from the first intermediary communication device to the second intermediary communication device.

Also provided is a method, in one variation, of maintaining data connectivity between a mobile device during traversal of a pedestrian facility and a server computing device via a set of intermediary communication devices is provided. The method, executed in a processor of the server device comprises, while the mobile device is in data connectivity via a first intermediary communication device, receiving an indication that the mobile device is localized to a position between a first and a second intermediary communication devices of the set of intermediary communication devices, based on an inertial sensor device including at least one of a gyroscope, an accelerometer and the magnetometer, determining a directional heading of the mobile device, inferring, based on the directional heading, at least one of an unobstructed line of sight wireless signal transmission path to the second intermediary communication device, and a more obstructed line of sight wireless signal transmission path to the first intermediary communication device, and based on the inferring, maintaining the data connectivity with the mobile device by switching from the first intermediary communication device to the second intermediary communication device.

Further provided is a network manager server computing system, which in an embodiment may be a server computing device, for maintaining data connectivity between a mobile device during traversal of a pedestrian facility and a server device via a set of intermediary communication devices. The system includes a memory storing a set of computer instructions that, when executed in a processor of the server computing device, receives, while the mobile device is in data connectivity via a first intermediary communication device of the set, a request for transitioning the data connectivity to a second intermediary communication device of the set, the request including a first position of the mobile device as localized, based on fingerprint data of the pedestrian facility, at a first distance from the first position to the first intermediary communication device, and a second distance from the first position to a second intermediary communication device of the set, and maintaining the data connectivity with the mobile device by switching, based on the first and the second distances, from the first intermediary communication device to the second intermediary communication device.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some embodiments described herein can generally require the use of computing devices, including processor and non-transitory memory resources. For example, one or more embodiments described herein may be implemented, in whole or in part, on computing devices such as servers, desktop computers, mobile devices including cellular or smartphones, wearable devices, tablet devices and laptop computing devices. Memory, processing, and network resources may all be used in connection with the establishment, use, or performance of any embodiment described herein, including with the performance of any method or with the implementation of any system.

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable memory storage units, flash memory and magnetic memory. Computers, terminals, network enabled devices (e.g., mobile devices, such as cell phones) are all examples of machines and devices that utilize processors, memory, and instructions stored on computer-readable mediums. Additionally, embodiments may be implemented in the form of computer-programs, or a computer usable carrier medium capable of carrying such a program.

System Description

Figure 1:
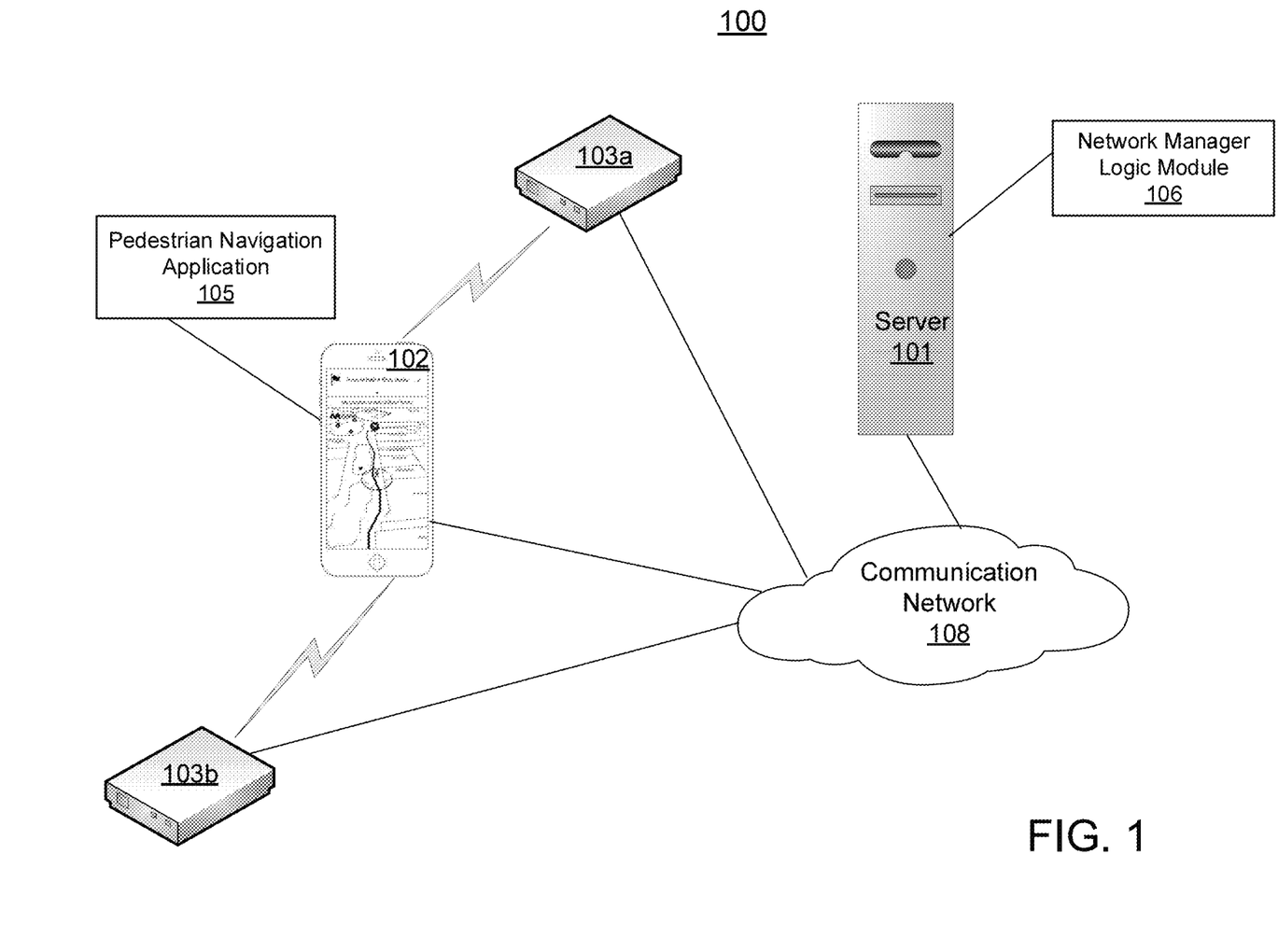
FIG. 1 illustrates, in an example embodiment, a system for localization-enabled data connectivity transitions.

FIG. 1 illustrates, in an example embodiment, system 100 for localization-enabled data connectivity transitioning within or proximate a pedestrian-accessible facility in which mobile device 102 assumes a primary role for the data connectivity switching decisions. Mobile computing device 102, also referred to as mobile device 102 herein, may include pedestrian navigation application 105, and is communicatively connected via one of intermediary access point devices 103*a*, 103*b* and communication network 108 to network management server computing device 101 (also referred to herein as server device 101 and server 101). Network management server device 101 may include network manager logic module 106. In one embodiment, mobile device 102 may correspond to, for example, a cellular communication device (e.g., a smartphone) that is capable of telephony, messaging, and data computing. In variations, mobile device 102 can correspond to, for example, a tablet computer or a wearable computing and communication device. Mobile device 102 may include a processor, a non-transitory memory, a graphical user interface (GUI) display screen, input mechanisms such as a keyboard or software-implemented touchscreen input functionality, barcode, QR code or other symbol- or code-scanner input functionality. Mobile device 102 may include sensor functionality by way of sensor devices including any of inertial sensors (accelerometer, gyroscope), magnetometer or other magnetic field sensing functionality, as barometric or other environmental pressure sensing functionality. Mobile device 102 may also include capability for detecting and communicatively accessing wireless communication signals, including but not limited to any of Bluetooth, Wi-Fi, RFID, and GPS signals. Mobile device 102 further includes the capability for detecting and measuring a received signal strength of the wireless communication signals. In other variations, mobile device 102 may include location determination capability such as by way of a Global Positioning System (GPS) location data capability, and may be communicatively coupled to communication network 108, such as by sending and receiving cellular data over data and voice channels.

Pedestrian navigation application 105, in one embodiment, may be a software application that is downloaded, such as from server computing device 101, installed, and stored in a non-transitory memory of mobile device 102.

During execution, for example in a processor of mobile device 102, of computer instructions that constitute pedestrian navigation application 105, a physical layout map of an indoor facility or building being traversed by a user in possession of mobile device 102 may be displayed within a graphical user interface (GUI) display of mobile device 102. The term pedestrian as used herein is intended to encompass not only walking pedestrians, but also users moving at typical pedestrian speeds, for example at typically less than 10 miles per hour, using automated means such as automated wheelchairs or automated people-moving indoor carts and similar automated people-moving systems. The terms indoor facility or building as used herein means an at least partially enclosed building having at least one fixed boundary, such as an exterior boundary wall.

Figure 2:
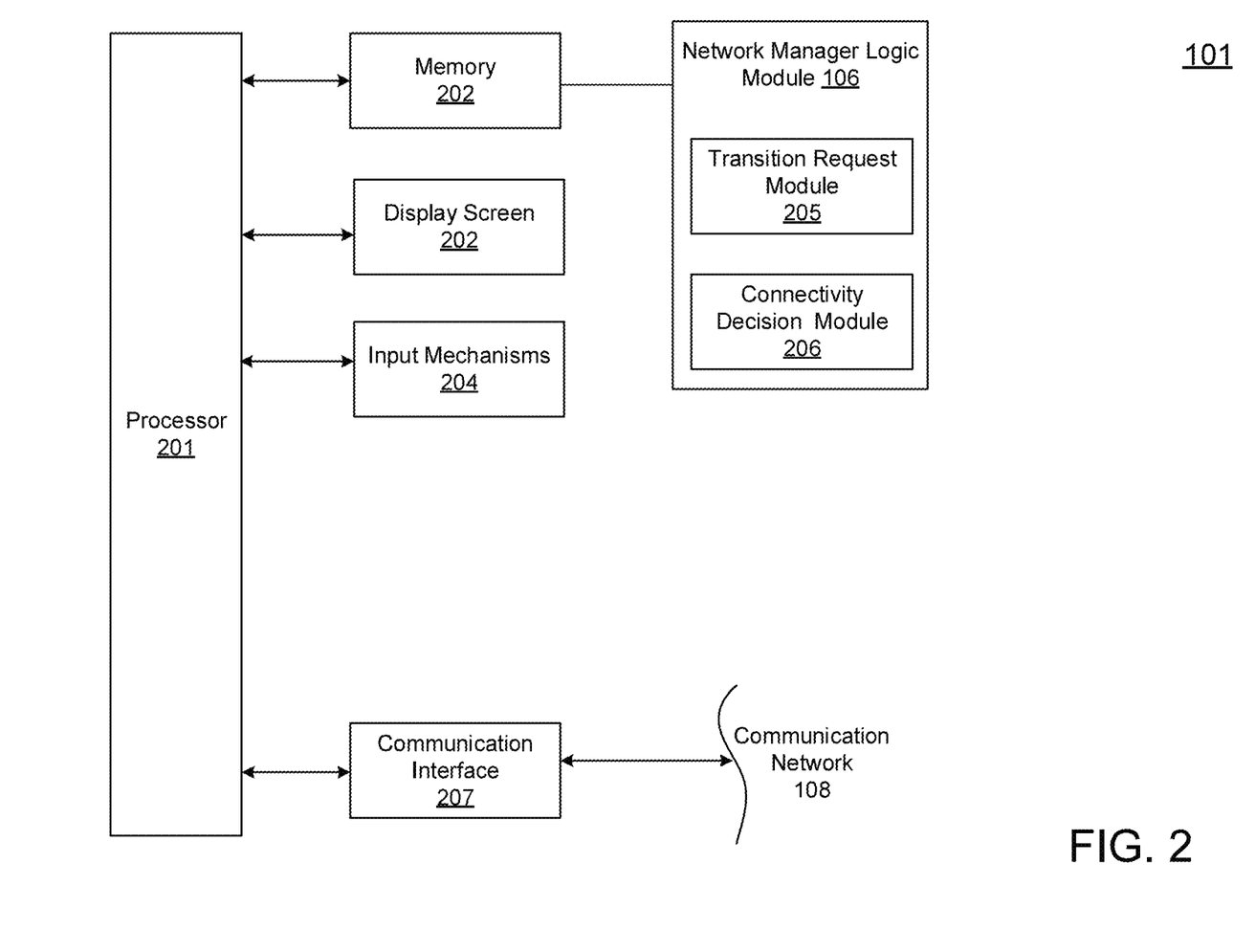
FIG. 2 illustrates an example architecture of a network management computing and communication server device for use with a localization-enabled data connectivity transitioning system.

FIG. 2 illustrates an example architecture of network management computing and communication server device 101, also referred to herein as server 101, for use with localization-enabled data connectivity transitioning system 100. Server 101, in embodiment architecture 200, may be implemented on one or more server devices, and includes processor 201, memory 202 which may include a read-only memory (ROM) as well as a random access memory (RAM) or other dynamic storage device, display screen or device 203, input mechanisms 204 and communication interface 207 communicatively coupled to communication network 108. Processor 201 may be configured with software and/or other logic to perform one or more processes, steps and other functions as implemented herein, such as described by FIG. 1 through FIG. 4 herein. Processor 201 may process information and instructions stored in memory 202, such as provided by a random access memory (RAM) or other dynamic storage device, for storing information and instructions which are executable in processor 201.

Network manager logic module 106 of server device 101 may include processor-executable instructions stored in RAM, in one embodiment, in memory 202, and may be constituted of sub-modules including transition request module 205 and connectivity decision module 206.

Fingerprint data stored in a database on server 101 may be used to track mobile device 102 traversal along trajectory or route within, and even adjoining, the indoor facility by localizing mobile device 102 to particular positions according to pre-mapped, or pre-calibrated, fingerprint data of the indoor facility. The area may be an indoor area within a shopping mall, an airport, a warehouse, a sports arena, a university campus, or any at least partially enclosed building. In embodiments, the fingerprint data further includes respective time-stamps, whereby the orientation, the magnetic field strength and direction, the received wireless signal strength, the barometric pressure, and the position data can be time-correlated for any given position along a trajectory or trajectory segment along the indoor facility, in accordance with the respective time-stamps. In embodiments, the fingerprint data as mapped, which may be hosted at memory 202 of server 101 and made communicatively accessible to mobile device 102 via communication network 108 and intermediary access points 103*a*, 103*b*, further associates particular positions along route 103 with any combination of fingerprint data, including fingerprint data acquired using a gyroscope, accelerometer, magnetometer, wireless signal strength measurement, wireless connectivity indications, barometric sensors, acoustic sensors, line-of sight sensors, and ambient lighting sensors, in addition to magnetic data stored thereon.

The terms fingerprint and fingerprint data as used herein refer to time-correlated, individual measurements of any of, or any combination of, received wireless communication signal strength and signal connectivity parameters, magnetic field parameters (strength, direction) or barometric pressure parameters, and mobile device inertial sensor data at known, particular locations along a route being traversed, and also anticipated for traversal, by the mobile device. In other words, a fingerprint may include a correlation of sensor and signal information (including, but not necessarily limited to wireless signal strength, magnetic or barometric information, inertial sensor information) associated for a unique location relative to the facility. Thus, fingerprint data associated with a particular location or position establishes a fingerprint signature that uniquely correlates to that particular location or position and applied to localize the mobile device at a particular position or location along a trajectory of motion across the indoor area based on that fingerprint signature. Fingerprint data may be used to track traversal of mobile device 102 along a sequence of positions that constitute a pedestrian route within, and adjoining, an indoor facility. Mobile device 102 signal and sensor information as measured during a fingerprint calibration process may be time-averaged across particular periods of time, with the time-averaged value being used to represent the signal information at any given instance of time within that particular period of time in which the signal information is time-averaged.

The term data connectivity as used in the context of data connectivity herein refers to a wireless radio frequency (RF) signal being available and active in accomplishing bi-directional data communication between devices that both transmit and receive data via a wireless RF signal, such as between mobile device 102 and network management server 101, including when such bi-directional data communication is being operated via intermediary communication devices, such as network access point devices 103*a* and 103*b* of FIG. 1. Transitioning or switching data connectivity as used herein refers to terminating data connectivity with one device in favor of establishing data connectivity with another. For example, mobile device 102 may be in data connectivity with server 101 via access point 103*a*, but then switches or transitions to establish data connectivity with access point device 103*b* in order to maintain uninterrupted bi-directional data communication with network management server device 101.

Processor 201 uses executable instructions stored in transition request module 205 of network management server 101 to receive, or access, localization information including coordinate positions of mobile device 102 at a first position while in data connectivity with mobile device 102 via a first intermediary access point device 103*a* (also referred to herein as a first intermediary communication device 103*a*). Server 101 in conjunction with mobile device 102 may localize mobile device 102 to particular coordinate positions within the pedestrian facility, based on fingerprint data accessible to server 101, and in one variation, also accessible to mobile device 102. The fingerprint data may include measurements correlated in time and position with wireless communication signal signatures and mobile device 102 sensor readings in accordance with calibrations established in a fingerprint database of the pedestrian area that is communicative accessible to server 101, and to mobile device 102 in another embodiment. The localizing may be based on any one or more of a mobile device orientation, a magnetic field strength and direction, a received wireless communication signal strength, a wireless connectivity indication and a barometric pressure in accordance with the fingerprint data of the pedestrian facility.

Processor 201 also uses executable instructions stored in transition request module 205 to determine a first distance from a position of mobile device 102 as localized to first intermediary access point device 103a, and a second distance from the position of mobile device 102 as localized to second intermediary access point device 103b (also referred to herein as intermediary communication device 103b). Embodiments described herein presume foreknowledge by mobile device 102, such as from pedestrian navigation application 105 installed thereon, of specific location or position (X, Y, Z) coordinates for individual access point devices as deployed in infrastructure of the indoor or pedestrian facility, such as may be obtained from a mapping of the placement of individual access point devices of a given wireless network within the indoor facility. The term intermediary as used herein refers to the role of an access point or similar device in providing a bridge or an intermediate node through which mobile device 102 and network management server 101 (also referred to as server 101 herein) accomplish bi-directional data communication with each other. In embodiments, such an intermediary device may be a Bluetooth, a Bluetooth Low Energy (BLE) or a Wi-Fi access point device deployed or fixed within infrastructure of the indoor facility. However, intermediary devices conforming to other wireless communication standards are also contemplated.

The terms position or location as used herein refers to a coordinate location expressed in local or global (X, Y) horizontal coordinate terms. In some embodiments, the coordinates may further include a Z coordinate representing a height, for example associated with a given floor within a multi-floor building, and thus expressed in (X, Y, Z) coordinate terms.

Processor 201 uses executable instructions stored in connectivity decision module 206 for maintaining data connectivity with mobile device 102 by switching, based on the first and the second distances, from first intermediary communication device 103a to second intermediary communication device 103b. The term switching as used herein refers to the process of transitioning the bi-directional data connection between mobile device 102 and server 101 using an alternate or second access point device in lieu of the currently-in-use access point intermediary device, whereby the bi-directional data transmission capability and connection with network server 101 is maintained. It is contemplated that in alternate embodiments, at least some portions of the functionality of mobile device localization module 205 and access point proximity module 206 may be performed at mobile device 102, in communication and in conjunction with server 101.

In one variation, upon localizing mobile device 102 at a position between two access point devices, data connectivity is switched to the whichever access point device becomes spatially closer to mobile device 102 as the user carrying mobile device 102 traverses the indoor facility. In such an embodiment, the data connectivity between mobile device 102 and network management server 101 is maintained by switching from first intermediary access point device 103a to second intermediary device 103b when the distance between mobile device 102 and access point 103a becomes greater than the distance between mobile device 102 and access point device 103b as the user carrying mobile device 102 traverses generally from access point device 103a towards access point device 103b.

In another embodiment, mobile device 102 includes one or more inertial sensors, such as one or any combination of a gyroscope, an accelerometer and a magnetometer, to determine, in conjunction with pedestrian navigation application 105, a directional heading of the user of mobile device 102 during traversal of the indoor or pedestrian facility. Upon localizing the mobile device to a position between the first access point intermediary device 103 and the second intermediary access point device 103b, and upon determining, in conjunction with pedestrian navigation application 105, that mobile device 102 is traversing in a directional heading towards the second intermediary device 103b, data connectivity of server 101 with mobile device 102 may be maintained by switching from first intermediary device 103a to second intermediary device 103b even while mobile device 102 is spatially closer to 103a than to 103b. This embodiment contemplates and implements switching data connectivity to a spatially farther away access point device in lieu of a spatially closer access point device having a currently-established data connectivity link with mobile device 102 and provides a technical advantage of minimizing signal transmission distortions and interference, resulting in a higher-quality or higher-integrity data connection. It is recognized that because of the typical manner in which a mobile phone user carries or upholds mobile device 102 ahead of their torso in order to easily glance at or view the display screen of mobile device 102 during traversal, wireless access point device 103b is more likely to have a clear and physically unobstructed line of sight access to access point device 103b than to 103a, since the later would lie generally behind the user's torso in this embodiment.

This counterintuitive scheme of switching data connectivity to a farther-away (relative to the distance between mobile phone 102 and access point device 103a) access point device 103b that is in front of, or facing, a user traversing towards access point intermediary device 103b results in a better quality wireless data connection for bi-directional data transmissions between mobile device 102 and network management server 101 via access point device 103b instead of access point device 102a, at least due to a relatively uninterrupted line of sight connection with access point device 103b that minimizes wireless signal interference and distortions from the user's torso, and also from clothing and clothing accessories worn by the mobile device-carrying user.

Methodology

Figure 3:
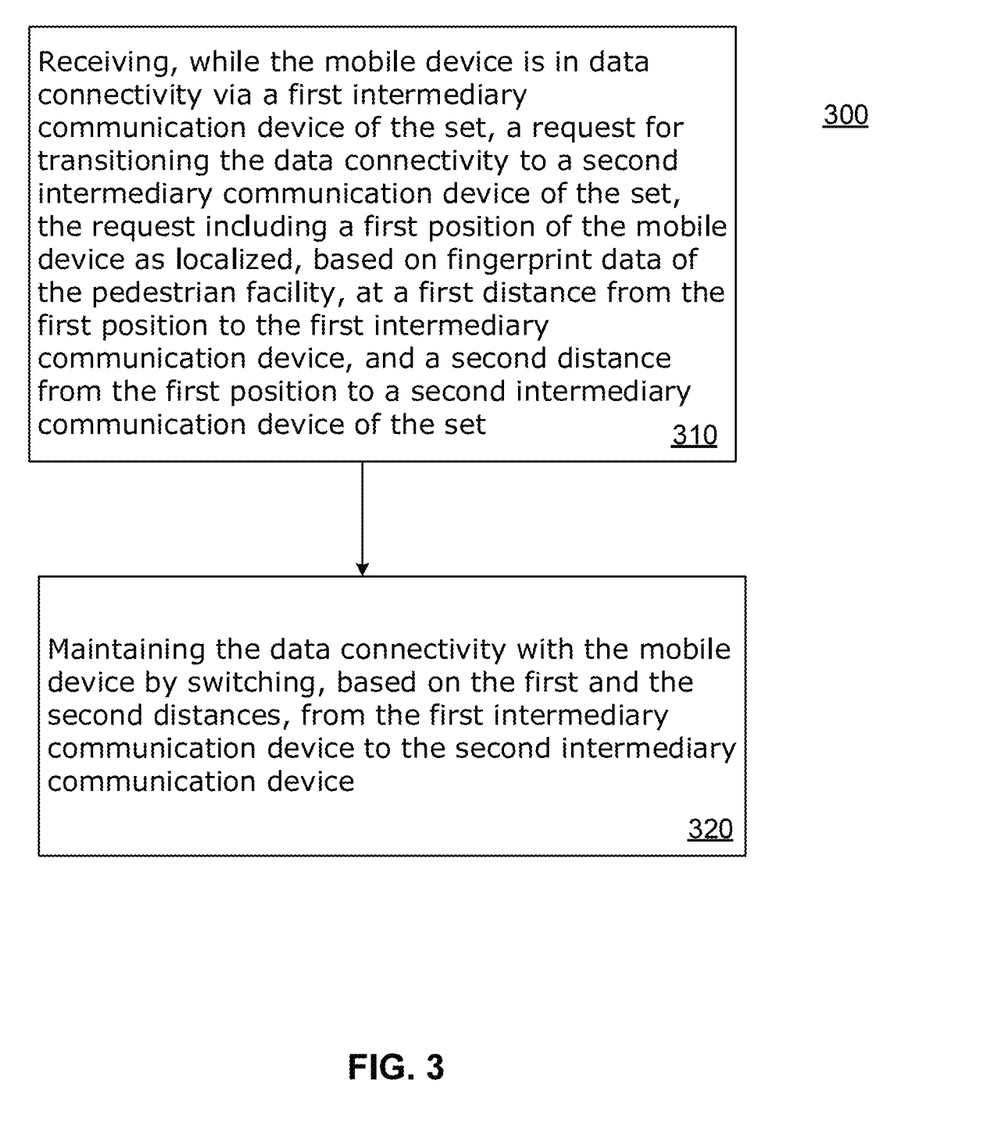
FIG. 3 illustrates, in an example embodiment, a method of operation of a localization-enabled data connectivity transitioning system.

FIG. 3 illustrates, in an example embodiment, method 300 of operation of localization-enabled data connectivity system 100. In describing examples of FIG. 3, reference is made to the examples of FIGS. 1-2 for purposes of illustrating suitable components or elements for performing a step or sub-step being described.

In embodiments, network manager logic module 106 may include sequences of processor-executable instructions within sub-modules including transition request module 205 and connectivity decision logic module 206. Such instructions may be read into memory 202 of server 101 from machine-readable medium, such as memory storage devices. Execution of the sequences of instructions contained in transition request module 205 and connectivity decision logic module 206 of network manager logic module 106 in memory 202 causes processor 201 to perform the process steps described herein. It is also contemplated that, in some alternate implementations, some portions of executable instructions constituting network manager logic module 106, may be hosted at mobile device 102. In alternative implementations, at least some hard-wired circuitry may be used in place of, or in combination with, the software logic instructions to implement examples described herein. Thus, the examples described herein may not be limited to any fixed combination of hardware circuitry and software instructions.

At step 310, based upon processor 201 of server device 101 executing the computer code or instructions of transition request module 205, receiving, mobile device 102 is in data connectivity via first intermediary communication device 103a, a request for transitioning the data connectivity to second intermediary communication device 103b, the request including a first coordinate position of mobile device 102 as localized, based on fingerprint data of the pedestrian facility, at a first distance from the first position to first intermediary communication device 103a, and a second distance from the first position to second intermediary communication device 103b. The intermediary communication devices may be of a set of wireless signal access point communication devices installed in the indoor facility or pedestrian facility, in an embodiment. The fingerprint data may include measurements correlated in time and position with wireless communication signal signatures and mobile device 102 sensor readings in accordance with calibrations established in a fingerprint database of the pedestrian area that is communicative accessible to server 101, and to mobile device 102 in another embodiment. Yet further, the localizing may be based on any one or more of a mobile device orientation, a magnetic field strength and direction, a received wireless communication signal strength, a wireless connectivity indication and a barometric pressure in accordance with the fingerprint data of the pedestrian facility. Embodiments described herein presume foreknowledge of specific location or position (X, Y, Z) coordinates for individual access point devices as deployed in infrastructure of the indoor or pedestrian facility, such as from a mapping of the placement of respective access point devices within the facility. The term intermediary as used herein refers to the role of a access point or similar device in providing a bridge or an intermediate node through which mobile device 102 and network management server 101 (also referred to as server 101 herein) accomplish bi-directional data communication with each other. In embodiments, such an intermediary device may be a Bluetooth, a Bluetooth Low Energy (BLE) or a Wi-Fi access point device deployed or fixed within infrastructure of the indoor facility. However, intermediary devices conforming to other wireless communication standards are also contemplated.

At step 320, upon processor 201 of server 101 (also referred to herein as network server 101) executing the instructions of connectivity decision module 206, maintaining the data connectivity with mobile device 102 by switching, based on the first and the second distances, from first intermediary communication device 103a to second intermediary communication device 103b. The term switching as used herein refers to the process of, while mobile phone 102 accomplishes bi-directional data transmission with server 101 via a first access point intermediary device, transitioning the data connection in favor of a second access point device in lieu of that first access point intermediary device, whereby the bi-directional data transmission capability and connection with network server 101 is maintained. Although functionality pertaining to steps 310 and 320 are primarily described as performed by server 101, it is also contemplated that in alternate embodiments, at least some portions of the functionality of transition request module 205 and connectivity decision module 206 may be performed at mobile device 102, in communication and in conjunction with server 101.

In one variation, upon localizing mobile device 102 at a position between two access point devices, data connectivity is switched to the whichever access point device becomes spatially closer to mobile device 102 as the user carrying mobile device 102 traverses the indoor facility. In such an embodiment, the data connectivity between mobile device 102 and network management server 101 is maintained by switching from first intermediary access point device 103a to second intermediary device 103b when the first distance becomes greater than the second distance.

Figure 4:
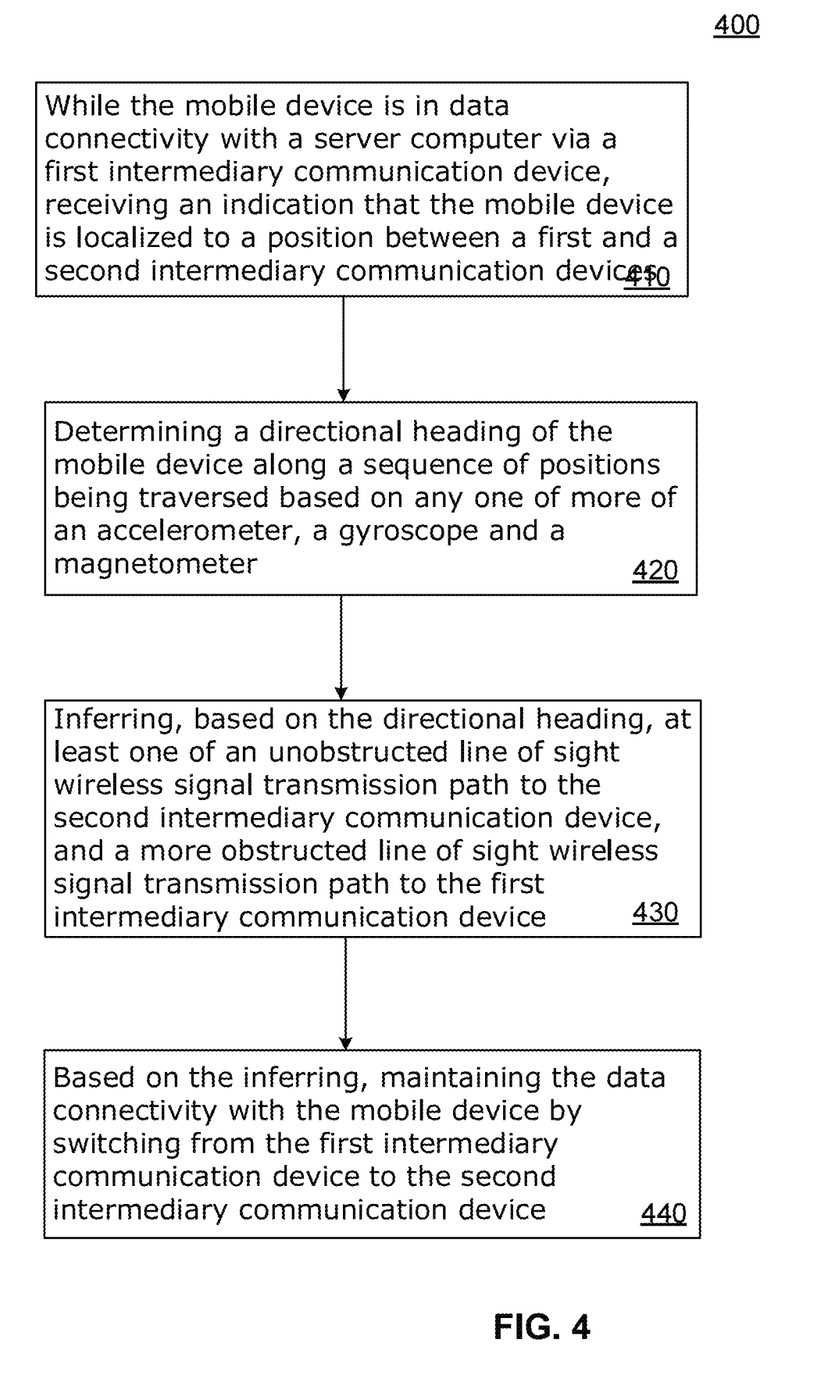
FIG. 4 illustrates another example embodiment of the method of operation of the localization-enabled data connectivity transitioning system.

FIG. 4 illustrates another example embodiment method 400 of operation of the localization-enabled data connectivity transitioning system. In one variation, mobile device 102 includes one or more inertial sensors, such as one or any combination of a gyroscope, an accelerometer and a magnetometer, to determine, in conjunction with pedestrian navigation application 105, a directional heading of a user or carrier of mobile device 102 during traversal of the indoor or pedestrian facility. Upon localizing the mobile device to a position between the first access point intermediary device 103 and the second intermediary access point device 103b, and upon determining, in conjunction with pedestrian navigation application 105, that mobile device 102 is traversing in a directional heading towards the second intermediary device 103b, data connectivity of server 101 with mobile device 102 may be maintained by switching from first intermediary device 103a to second intermediary device 103b even while mobile device 102 is spatially closer to 103a than to 103b. This embodiment contemplates and implements switching data connectivity to a spatially farther away access point device in lieu of a spatially closer access point device having a currently-established data connectivity link with mobile device 102 and provides a technical advantage of minimizing signal transmission distortions and interference, resulting in a higher-quality or higher-integrity data connection.

At step 410, while mobile device 102 is in data connectivity with network management server 101 via first intermediary communication device 103a, receiving an indication that the mobile device 102 is localized to a coordinate position between first intermediary communication device 103a (also referred to as intermediary access point device 103a herein) and a second intermediary communication device 103b (also referred to as intermediary access point device 103a herein).

At step 420, determining a directional heading of mobile device 102 along a sequence of positions being traversed based on any one of more of an accelerometer, a gyroscope and a magnetometer.

At step 430 inferring, based on the directional heading, that a more unobstructed line of sight signal transmission path exists to intermediary access point device 103b than compared to intermediary access point device 103a to which mobile device 102 is currently connected.

At step 440, maintaining the data connectivity with network management server 101 by transitioning to data connectivity with intermediary access point device 103b in lieu of intermediary access point device 103a. It is recognized that because of the typical manner in which a mobile phone user upholds mobile device 102 ahead of their torso in order to easily glance at or view the display screen of mobile device 102 during traversal of a pedestrian facility, wireless access point device 103b is more likely to have a clear and physically unobstructed line of sight signal transmission path to access point device 103b, than compared to 103a which lying generally behind the user's torso in this embodiment, would be subject to relatively more signal transmission distortion and attenuation caused by the physical obstructions of torso and clothing accessories.

It is further recognized that a scheme of switching data connectivity to a farther-away (relative to the distance between mobile phone 102 and access point device 103a) access point device 103b that is in front of, or facing, a user traversing towards access point intermediary device 103b results in a better quality wireless data connection for bi-directional data transmissions between mobile device 102 and network management server 101 via access point device 103b instead of access point device 102a is counterintuitive, based at least due to a relatively uninterrupted line of sight signal transmission path with access point device 103b that minimizes wireless signal interference and distortions caused by the user's torso and from clothing and clothing accessories worn by the mobile device-carrying user.

It is contemplated that embodiments described herein extend to individual elements and concepts described herein, independently of other concepts, ideas or system, as well as for embodiments to include combinations of elements recited anywhere in this application. Although embodiments are described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mention of the particular feature. Thus, the absence of describing combinations should not preclude the inventor from claiming rights to such combinations.

What is claimed is:

1. A method of minimizing signal interference and distortions between a mobile device traversing a pedestrian facility and a server computing device, the method executed in a processor of the server computing device and comprising:
    accessing localization information including coordinate positions of the mobile device while in data connectivity with the mobile device via a first access point device from a set of access point devices, the position of the mobile device being closer to the first access point device than the position of the mobile device to a second access point device from the set of access point devices;
    while the mobile device is in data connectivity via the first access point device, receiving a request from the mobile device to transition to the second access point device;
    determining a directional heading of the mobile device, based on an inertial sensor device of the mobile device;
    inferring, based on the directional heading, at least one of a physically unobstructed line of sight wireless signal transmission path to the second access point device, and a more physically obstructed line of sight wireless signal transmission path to the first access point device, wherein an obstruction in a line of sight wireless signal transmission path is based on whether a mobile device-carrying user upholds the mobile device ahead of their torso; and
    based on the inferring, minimizing the signal interference and distortions caused by the mobile device-carrying user by switching from a spatially closer access point device to a spatially farther access point device, the spatially closer access point device being the first access point device and the spatially farther access point device being the second access point device, wherein, while traversing the pedestrian facility, the mobile device faces the second access point device and the first access point is behind the mobile device.

2. The method of claim 1, wherein switching from the spatially closer access point device to the spatially farther access point device includes establishing a bi-directional data transmission between the server computing device and the second access point device.

3. The method of claim 1, wherein an obstruction in a line of sight wireless signal transmission path is based on a manner in which the mobile device-carrying user carries the mobile device.

4. The method of claim 1, wherein the physically unobstructed line of sight wireless signal transmission path being inferred when a user of the mobile device faces the second access point device and the physically obstructed line of sight wireless signal transmission path being inferred when the first access device is behind the user.

5. The method of claim 1, wherein the method further comprises providing coordinate placement information of the set of access point devices within the pedestrian facility to the mobile device to identify an access point device for switching.

6. The method of claim 1, wherein the localization information indicates that the mobile device is localized to a position between the first access point devices and the second access point devices of the set of access point devices.

7. The method of claim 1, wherein the pedestrian facility is one of a shopping mall, an airport facility, a warehouse, a college building, an office building, a sports arena and an at least partially enclosed building.

8. The method of claim 1, wherein the mobile device is localized based on at least one of a mobile device orientation, a magnetic field strength and direction, a received wireless communication signal strength, a wireless connectivity indication and a barometric pressure in accordance with fingerprint data of the pedestrian facility.

9. The method of claim 8, wherein the fingerprint data includes respective time-stamps whereby the mobile device orientation, the magnetic field strength and direction, the received wireless signal strength, the wireless connectivity indication and the barometric pressure are correlated in accordance with the respective time-stamps.

10. The method of claim 1, wherein the set of access point devices comprises at least one of a Bluetooth® access point device, a Bluetooth® Low Energy (BLE) access point device, and a Wi-Fi access point device.

11. A server computing system for minimizing signal interference and distortions between a mobile device traversing a pedestrian facility and the server computing device, the server computing system comprising:
    a processor; and
    a memory storing a set of instructions, the instructions executable in the processor to:
        access localization information including coordinate positions of the mobile device while in data connectivity with the mobile device via a first access point device from a set of access point devices, the position of the mobile device being closer to the first access point device than the position of the mobile device to a second access point device from the set of access point devices;

while the mobile device is in data connectivity via the first access point device, receive a request from the mobile device to transition to the second access point device;

determine a directional heading of the mobile device, based on an inertial sensor device of the mobile device;

infer, based on the directional heading, at least one of a physically unobstructed line of sight wireless signal transmission path to the second access point device, and a more physically obstructed line of sight wireless signal transmission path to the first access point device, wherein an obstruction in a line of sight wireless signal transmission path is based on whether a mobile device-carrying user upholds the mobile device ahead of their torso; and based on the inferring, minimize the signal interference and distortions caused by the mobile device-carrying user by switching from a spatially closer access point device to a spatially farther access point device, the spatially closer access point device being the first access point device and the spatially farther access point device being the second access point device, wherein, while traversing the pedestrian facility, the mobile device faces the second access point device and the first access point is behind the mobile device.

12. The server computing device of claim 11, wherein switching from the spatially closer access point device to the spatially farther access point device includes establishing a bi-directional data transmission between the server computing device and the second access point device.

13. The server computing device of claim 11, wherein an obstruction in a line of sight wireless signal transmission path is based on a manner in which the mobile device-carrying user carries the mobile device.

14. The server computing device of claim 11, wherein the physically unobstructed line of sight wireless signal transmission path is inferred when a user of the mobile device faces the second access point device and the physically obstructed line of sight wireless signal transmission path is inferred when the first access device is behind the user.

15. The server computing device of claim 11, wherein the processor further includes instructions to provide coordinate placement information of the set of access point devices within the pedestrian facility to the mobile device to identify an access point device for switching.

16. The server computing device of claim 11, wherein the localization information indicates that the mobile device is localized to a position between the first access point devices and the second access point devices of the set of access point devices.

17. The server computing device of claim 11, wherein the pedestrian facility is one of a shopping mall, an airport facility, a warehouse, a college building, an office building, a sports arena and an at least partially enclosed building.

18. The server computing device of claim 11, wherein the mobile device is localized based on at least one of a mobile device orientation, a magnetic field strength and direction, a received wireless communication signal strength, a wireless connectivity indication and a barometric pressure in accordance with fingerprint data of the pedestrian facility.

19. The server computing device of claim 18, wherein the fingerprint data includes respective time-stamps whereby the mobile device orientation, the magnetic field strength and direction, the received wireless signal strength, the wireless connectivity indication and the barometric pressure are correlated in accordance with the respective time-stamps.

20. The server computing device of claim 11, wherein the set of access point devices comprises at least one of a Bluetooth® access point device, a Bluetooth® Low Energy (BLE) access point device, and a Wi-Fi access point device.

* * * * *